(12) United States Patent
Hsu et al.

(10) Patent No.: US 10,372,645 B2
(45) Date of Patent: Aug. 6, 2019

(54) UNIVERSAL SERIAL BUS TYPE C TRANSMISSION LINE AND TRANSMISSION DEVICE

(71) Applicant: eEver Technology, Inc., Taipei (TW)

(72) Inventors: Shih-Min Hsu, Taipei (TW); Shao-Hung Chen, New Taipei (TW); Chien-Cheng Kuo, Taipei (TW)

(73) Assignee: eEver Technology, Inc., Taipei (TW)

( * ) Notice: Subject to any disclaimer, the term of this patent is extended or adjusted under 35 U.S.C. 154(b) by 0 days.

(21) Appl. No.: 15/822,220

(22) Filed: Nov. 27, 2017

(65) Prior Publication Data

US 2018/0150426 A1 May 31, 2018

Related U.S. Application Data

(60) Provisional application No. 62/426,611, filed on Nov. 28, 2016.

(51) Int. Cl.
| | |
|---|---|
| *G06F 13/00* | (2006.01) |
| *G06F 13/38* | (2006.01) |
| *G06F 13/364* | (2006.01) |
| *G06F 13/42* | (2006.01) |
| *G06F 13/28* | (2006.01) |
| *G06F 13/40* | (2006.01) |

(52) U.S. Cl.
CPC .......... *G06F 13/385* (2013.01); *G06F 13/287* (2013.01); *G06F 13/364* (2013.01); *G06F 13/4022* (2013.01); *G06F 13/4282* (2013.01); *G06F 2213/0042* (2013.01)

(58) Field of Classification Search
CPC .......................... G06F 13/385; G06F 13/4022
See application file for complete search history.

(56) References Cited

U.S. PATENT DOCUMENTS

| | | | |
|---|---|---|---|
| 2002/0169915 A1* | 11/2002 | Wu | G06F 13/4081 710/305 |
| 2017/0052578 A1* | 2/2017 | Agarwal | G06F 1/263 |
| 2018/0052799 A1* | 2/2018 | Shetty | G06F 13/4282 |

FOREIGN PATENT DOCUMENTS

CN          205488918 U      8/2016

* cited by examiner

*Primary Examiner* — Zachary K Huson
(74) *Attorney, Agent, or Firm* — Winston Hsu

(57) ABSTRACT

A universal serial bus (USB) type C transmission line includes a host-to-host bridge, a first multiplexer, and a second multiplexer. When a first device and a second device are coupled to the first multiplexer and the second multiplexer respectively, the first multiplexer determines whether the first device is a host or a slave device and the second multiplexer determines whether the second device is another host or another slave device, and the first device optionally communicates with the second device through the host-to-host bridge, the first multiplexer, and the second multiplexer, or through the first multiplexer and the second multiplexer according to determination results of the first multiplexer and the second multiplexer.

13 Claims, 6 Drawing Sheets

UNIVERSAL SERIAL BUS TYPE C TRANSMISSION LINE AND TRANSMISSION DEVICE

CROSS REFERENCE TO RELATED APPLICATIONS

This application claims the benefit of U.S. Provisional Application No. 62/426,611, filed on Nov. 28, 2016 and entitled "Method to enable/disable Host-to-Host Link function in USB-C cable," the contents of which are incorporated herein by reference.

BACKGROUND OF THE INVENTION

1. Field of the Invention

The present invention relates to a universal serial bus (USB) type C transmission line and a USB type C transmission device, and particularly to a USB type C transmission line and a USB type C transmission device that can make data be transmitted between two hosts, or between a host and a slave device.

2. Description of the Prior Art

Two ends of a traditional universal serial bus (USB) transmission line are a type-A connector and a micro-B connector (or a mini-B connector) respectively, wherein the type-A connector needs to be coupled to a host (e.g. a desktop computer or a laptop) and the micro-B connector needs to be coupled to a device (e.g. a digital camera or a digital voice recorder), so a problem of the type-A connector being coupled to the device and the micro-B connector being coupled to the host does not exist.

However, in fact, because there is still a requirement for the device needing to transmit data to another device, an On-The-Go (OTG) transmission line is developed for the above mentioned requirement, wherein the OTG transmission line can allow the device to restrictively transmit data to the another device. But, two ends of the OTG transmission line are micro-AB connectors, and the OTG transmission line also has some special specifications.

In addition, after a USB type-C transmission line is published, because both two ends of the USB type-C transmission line are type-C connectors, the USB type-C transmission line may be coupled to two hosts simultaneously. Meanwhile, data transmission cannot be executed between the two hosts unless a host of the two hosts has a dual master/slave function. However, the prior art does not provide related standard solutions for solving the above mentioned problem faced by the USB type-C transmission line. Therefore, how to solve the above mentioned problem faced by the USB type-C transmission line becomes an important issue.

SUMMARY OF THE INVENTION

An embodiment of the present invention provides a universal serial bus (USB) type C transmission line. The USB type C transmission line includes a host-to-host bridge, a first multiplexer, and a second multiplexer. When the first multiplexer and the second multiplexer are coupled to a first device and a second device respectively, the first multiplexer determines whether the first device is a host or a slave device and the second multiplexer determines whether the second device is another host or another slave device, and the first device optionally communicates with the second device through the host-to-host bridge, the first multiplexer, and the second multiplexer, or through the first multiplexer and the second multiplexer according to determination results of the first multiplexer and the second multiplexer.

Another embodiment of the present invention provides a USB type C transmission line. The USB type C transmission line includes a host-to-host bridge, a first multiplexer, and a second multiplexer. A first device coupled to the first multiplexer optionally communicates with a second device coupled to the second multiplexer through the host-to-host bridge, the first multiplexer, and the second multiplexer, or through the first multiplexer and the second multiplexer.

Another embodiment of the present invention provides a USB type C transmission device. The USB type C transmission device includes a host-to-host bridge, wherein a first device coupled to the USB type C transmission device communicates with a second device coupled to the USB type C transmission device optionally through the host-to-host bridge.

The present invention provides a USB type C transmission line and a USB type C transmission device. The USB type C transmission line and the USB type C transmission device utilize a first multiplexer and a second multiplexer to determine master/slave roles of a device and another device respectively when the first multiplexer and the second multiplexer are coupled to the device and the another device, respectively. Then, the USB type C transmission line and the USB type C transmission device make the device optionally communicate with the another device through a host-to-host bridge, the first multiplexer, and the second multiplexer, or through the first multiplexer and the second multiplexer according to determination results of the first multiplexer and the second multiplexer These and other objectives of the present invention will no doubt become obvious to those of ordinary skill in the art after reading the following detailed description of the preferred embodiment that is illustrated in the various figures and drawings.

DETAILED DESCRIPTION

Figure 1:
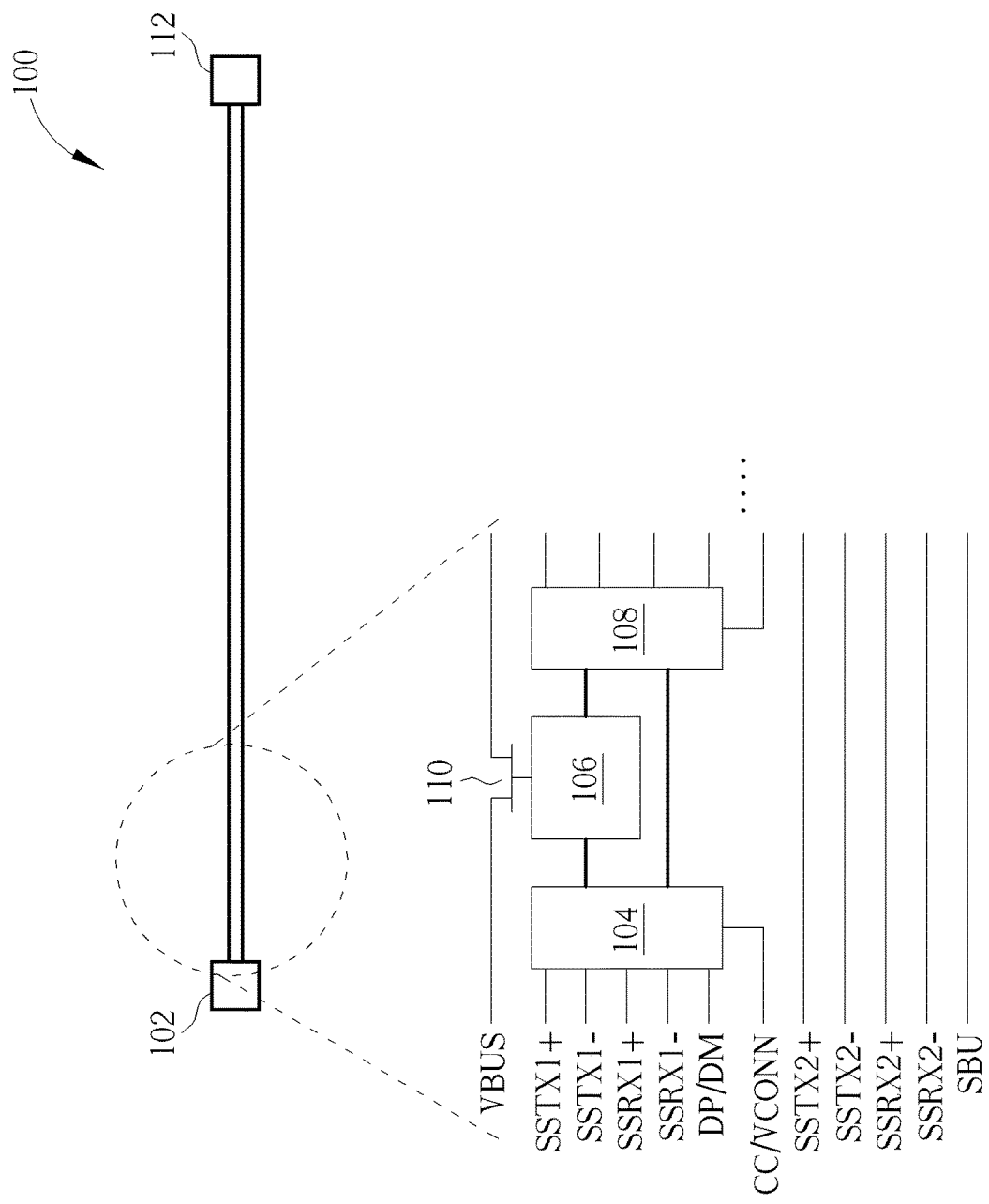
FIG. 1 is a diagram illustrating a universal serial bus (USB) type C transmission line according to a first embodiment of the present invention.

Please refer to FIG. 1. FIG. 1 is a diagram illustrating a universal serial bus (USB) type C transmission line (or USB type C cable) 100 according to a first embodiment of the present invention. As shown in FIG. 1, the USB type C transmission line 100 includes a first type C connector 102, a first multiplexer 104, a host-to-host bridge 106, a second multiplexer 108, a switch 110, and a second type C connector 112, wherein the first type C connector 102 is coupled to the first multiplexer 104, the second type C connector 112 is coupled to the second multiplexer 108, and the switch 110 is preset to be turned off. As shown in FIG. 1, the first multiplexer 104, the host-to-host bridge 106, and the second multiplexer 108 are coupled to a first USB super speed signal line group (SSTX1+, SSTX1−, SSRX1+, SSRX1−) of two USB super speed signal line groups (SSTX1+, SSTX1−, SSRX1+, SSRX1−, SSTX2+, SSTX2−, SSRX2+, SSRX2−) and a USB 2.0 signal line group (DP/DM). For example, USB super speed signal lines can be USB 3.x (e.g. x is 0, 1, 2) signal lines or other signal lines provided according to USB specifications for providing high transmission bandwidth. Functions of the USB super speed signal lines and the USB 2.0 signal line group (DP/DM) are obvious to a person of ordinary skill in the art, so further description thereof is omitted for simplicity. In addition, as shown in FIG. 1, functions of other signal lines (VBUS, CC, VCONN, SBU) of the USB type C transmission line 100 are also obvious to a person of ordinary skill in the art, so further description thereof is also omitted for simplicity.

Figure 2:
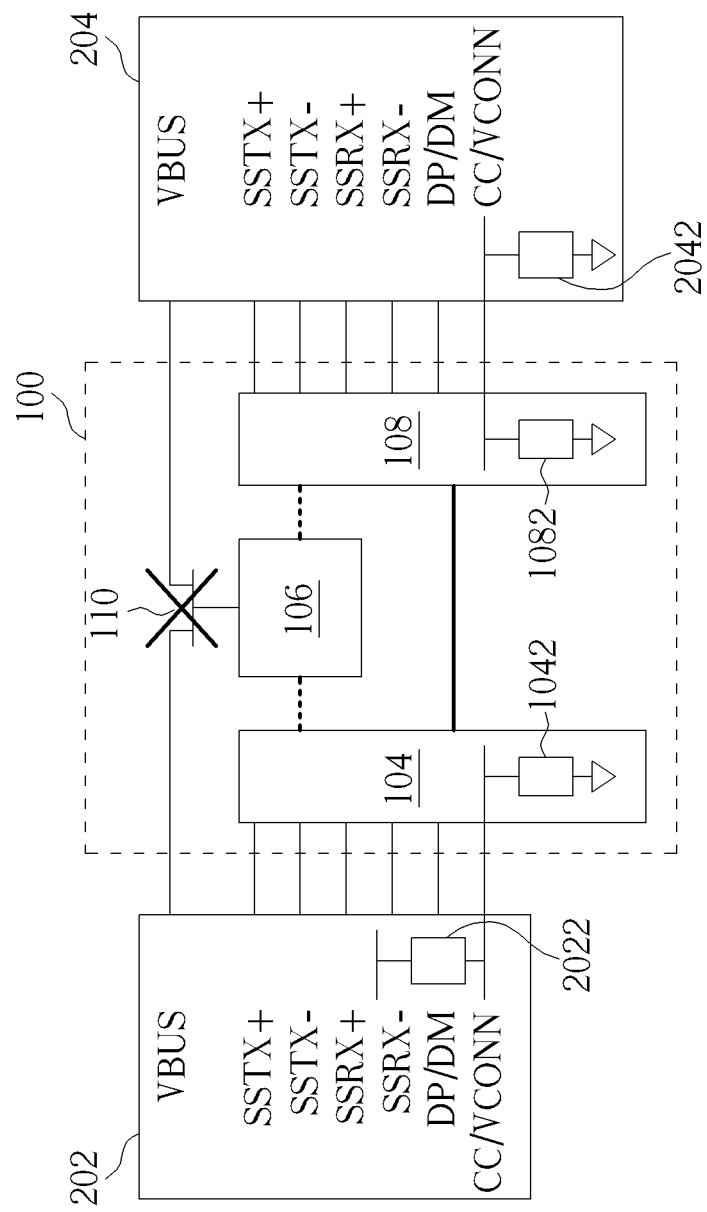
FIG. 2 is a diagram illustrating a first device being coupled to the USB type C transmission line through the first type C connector and a second device being coupled to the USB type C transmission line through the second type C connector.

Please refer to FIG. 2. FIG. 2 is a diagram illustrating a first device 202 being coupled to the USB type C transmission line 100 through the first type C connector 102 and a second device 204 being coupled to the USB type C transmission line 100 through the second type C connector 112, wherein the first type C connector 102 and the second type C connector 112 are not shown in FIG. 2 for simplifying FIG. 2. As shown in FIG. 2, the first device 202 is coupled to the first multiplexer 104 of the USB type C transmission line 100, and the second device 204 is coupled to the second multiplexer 108 of the USB type C transmission line 100, wherein the first multiplexer 104 can utilize a first pull-down resistor 1042 to imitate a slave device to determine whether the first device 202 is a first host (e.g. a desktop computer or a laptop) or a first slave device (e.g. a digital camera or a digital voice recorder), and the second multiplexer 108 can utilize a second pull-down resistor 1082 to imitate an another slave device to determine whether the second device 204 is a second host or a second slave device. If the first device 202 has a pull-up resistor 2022, when the first device 202 is coupled to the first multiplexer 104, the first multiplexer 104 determines that the first device 202 is the first host because a first voltage drop exists between the pull-up resistor 2022 and the first pull-down resistor 1042. In addition, if the second device 204 has a pull-down resistor 2042, when the second device 204 is coupled to the second multiplexer 108, the second multiplexer 108 determines that the second device 204 is the second slave device because no voltage drop exists between the pull-down resistor 2042 and the second pull-down resistor 1082.

Figure 3:
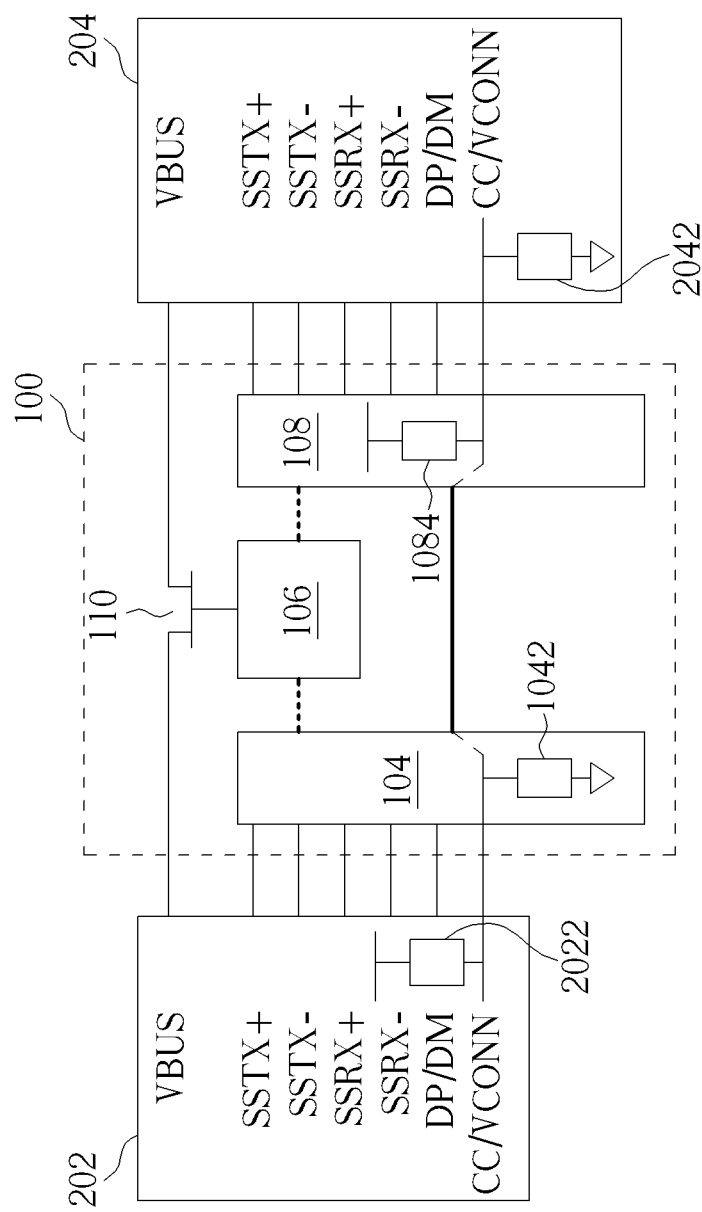
FIG. 3 is a diagram illustrating coupling relationships between the first device, the second device, the first multiplexer, and the second multiplexer when the first device is the first host and the second device is the second slave device.

Please refer to FIG. 3. FIG. 3 is a diagram illustrating coupling relationships between the first device 202, the second device 204, the first multiplexer 104, and the second multiplexer 108 when the first device 202 is the first host and the second device 204 is the second slave device. As shown in FIG. 3, because the first device 202 is the first host and the first multiplexer 104 imitates the slave device, a first master/slave coupling relationship between the first device 202 and the first multiplexer 104 can be established. In addition, because the second device 204 is the second slave device, the second multiplexer 108 can utilize a pull-up resistor 1084 to imitate a host. Therefore, because the second device 204 is the second slave device and the second multiplexer 108 imitates the host, a second master/slave coupling relationship between the second device 204 and the second multiplexer 108 can be established. As shown in FIG. 3, after the first master/slave coupling relationship and the second master/slave coupling relationship are established, the first multiplexer 104 is switched to directly communicate with the second multiplexer 108. That is, after the first master/slave coupling relationship and the second master/slave coupling relationship are established, the first device 202 bypasses the host-to-host bridge 106 to communicate with the second device 204 directly through the first multiplexer 104 and the second multiplexer 108, and meanwhile the first multiplexer 104 turns off the first pull-down resistor 1042 and the second multiplexer 108 turns off the pull-up resistor 1084. In addition, as shown in FIG. 3, because the first device 202 is the first host and the second device 204 is the second slave device, the host-to-host bridge 106 turns on the switch 110. Thus, the first device 202 can supply power to the second device 204 through the signal line VBUS and the switch 110, wherein the switch 110 is a power transistor.

Figure 4:
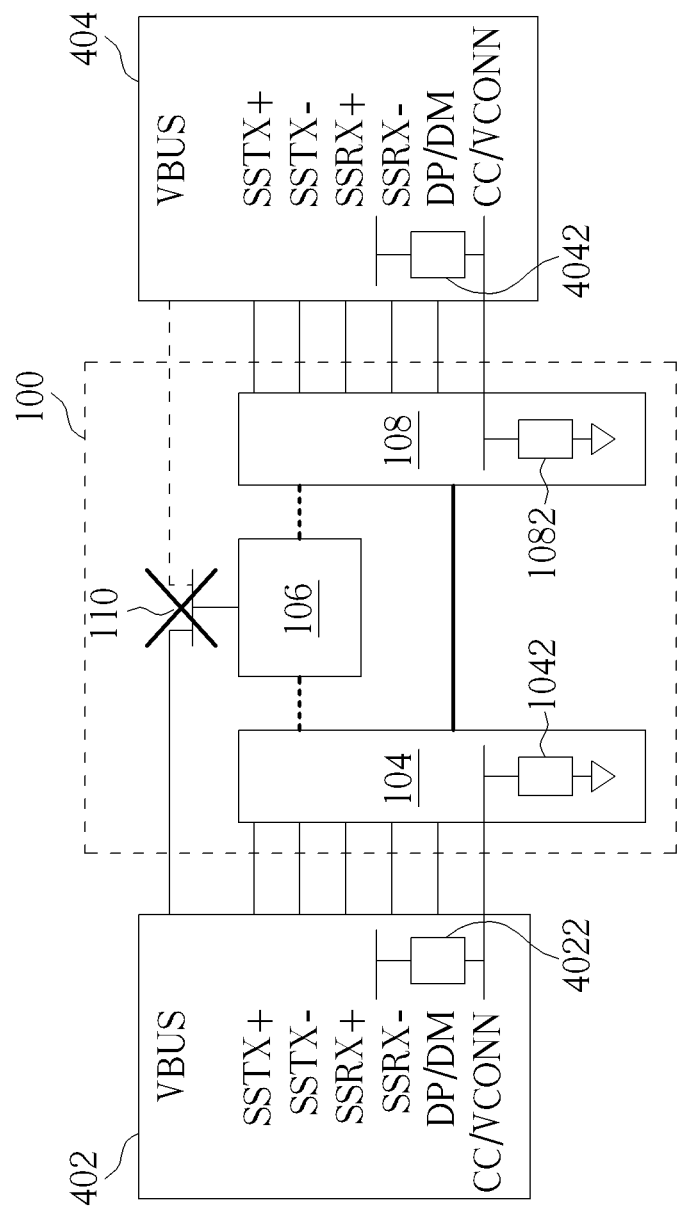
FIG. 4 is a diagram illustrating a first device being coupled to the USB type C transmission line through the first type C connector and a second device being coupled to the USB type C transmission line through the second type C connector.

Please refer to FIG. 4. FIG. 4 is a diagram illustrating a first device 402 being coupled to the USB type C transmission line 100 through the first type C connector 102 and a second device 404 being coupled to the USB type C transmission line 100 through the second type C connector 112, wherein the first type C connector 102 and the second type C connector 112 are not shown in FIG. 4 for simplifying FIG. 4. As shown in FIG. 4, the first device 402 is coupled to the first multiplexer 104 of the USB type C transmission line 100, and the second device 404 is coupled to the second multiplexer 108 of the USB type C transmission line 100, wherein the first multiplexer 104 can utilize the first pull-down resistor 1042 to imitate the slave device to determine whether the first device 402 is a third host or a third slave device, and the second multiplexer 108 can utilize the second pull-down resistor 1082 to imitate the another slave device to determine whether the second device 404 is a fourth host or a fourth slave device. If the first device 402 has a pull-up resistor 4022, when the first device 402 is coupled to the first multiplexer 104, the first multiplexer 104 determines that the first device 402 is the third host because a second voltage drop exists between the pull-up resistor 4022 and the first pull-down resistor 1042. In addition, if the second device 404 also has a pull-up resistor 4042, when the second device 404 is coupled to the second multiplexer 108, the second multiplexer 108 determines that the second device 404 is the fourth host because a third voltage drop exists between the pull-up resistor 4042 and the second pull-down resistor 1082.

Figure 5:
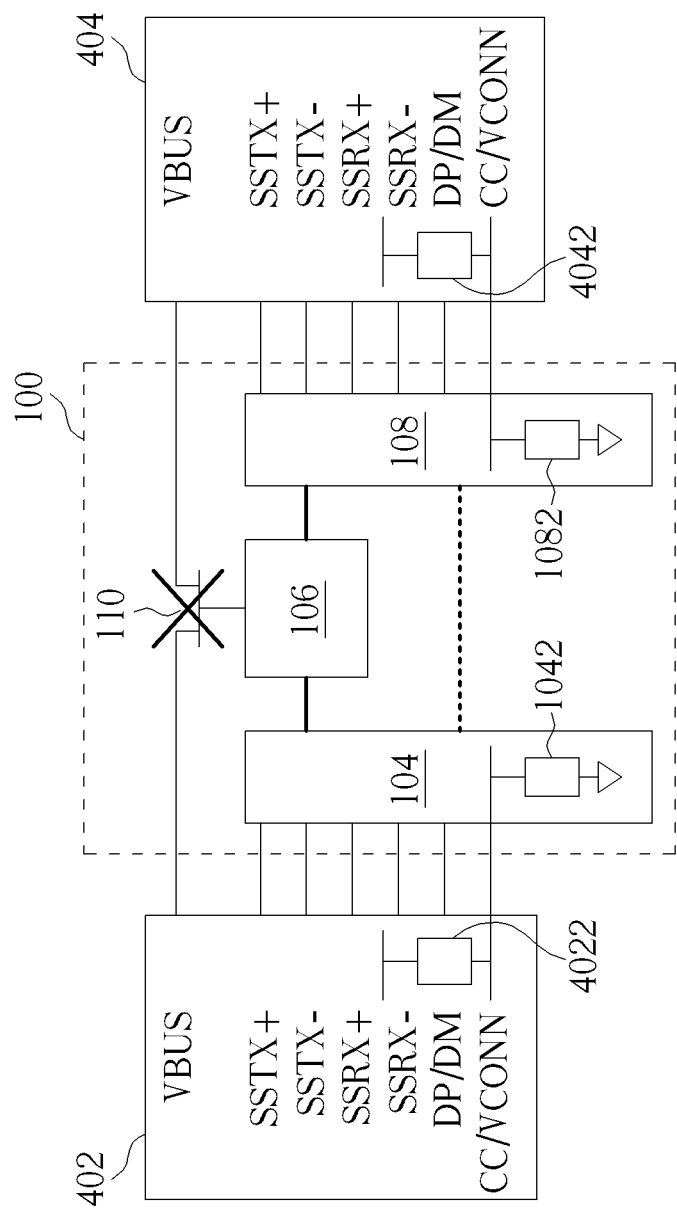
FIG. 5 is a diagram illustrating coupling relationships between the first device, the second device, the first multiplexer, the second multiplexer, and the host-to-host bridge when the first device is the third host and the second device is the fourth host.

Please refer to FIG. 5. FIG. 5 is a diagram illustrating coupling relationships between the first device 402, the second device 404, the first multiplexer 104, the second multiplexer 108, and the host-to-host bridge 106 when the first device 402 is the third host and the second device 404 is the fourth host. As shown in FIG. 5, because the first device 402 is the third host and the first multiplexer 104 imitates the slave device, a third master/slave coupling relationship between the first device 402 and the first multiplexer 104 can be established. In addition, because the second device 404 is the fourth host, and the second multiplexer 108 imitates the another slave device, a fourth master/slave coupling relationship between the second device 404 and the second multiplexer 108 can be established. In addition, after the third master/slave coupling relationship and the fourth master/slave coupling relationship are established, the first multiplexer 104 does not turn off the first pull-down resistor 1042 and the second multiplexer 108 does also not turn off the second pull-down resistor 1082.

As shown in FIG. 5, after the third master/slave coupling relationship and the fourth master/slave coupling relationship are established, the first multiplexer 104 is switched to communicate with the second multiplexer 108 through the host-to-host bridge 106. That is, after the third master/slave coupling relationship and the fourth master/slave coupling relationship are established, the first device 402 communicates with the second device 404 through the first multiplexer 104, the host-to-host bridge 106, and the second multiplexer 108. In addition, as shown in FIG. 5, because the first device 402 is the third host and the second device 404 is the fourth host, the host-to-host bridge 106 turns off the switch 110, that is, the second device 404 does not need power from the first device 402.

In addition, in another embodiment of the present invention, the host-to-host bridge 106 can integrate the first multiplexer 104 and the second multiplexer 108 to become a multiplexing host-to-host bridge. Therefore, when a fifth host and a sixth host are coupled to a USB type C transmission device (or a USB type C transmission line) including the multiplexing host-to-host bridge, the fifth host communicates with the sixth host through the multiplexing host-to-host bridge; and when the fifth host and a fifth slave device are coupled to the USB type C transmission device, the fifth host bypasses the multiplexing host-to-host bridge to communicate with the fifth slave device directly through the USB type C transmission device.

Figure 6:
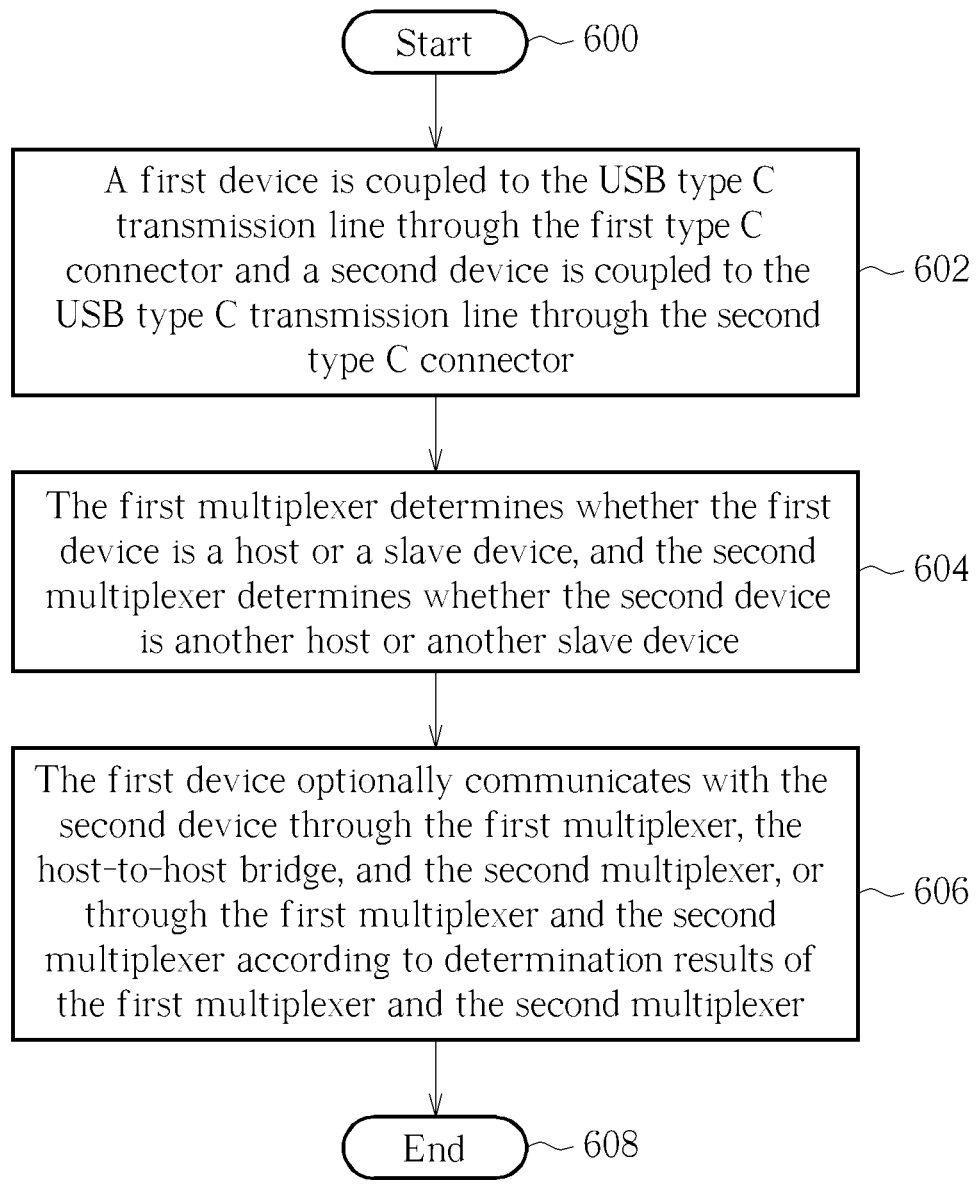
FIG. 6 is a flowchart illustrating an operation method of a USB type C transmission line according to a second embodiment of the present invention.

In addition, please refer to FIGS. 1-6. FIG. 6 is a flowchart illustrating an operation method of a USB type C transmission line according to a second embodiment of the present invention. The method in FIG. 6 is illustrated using FIGS. 1-5. Detailed steps are as follows:

Step 600: Start.

Step 602: A first device is coupled to the USB type C transmission line 100 through the first type C connector 102 and a second device is coupled to the USB type C transmission line 100 through the second type C connector 112.

Step 604: The first multiplexer 104 determines whether the first device is a host or a slave device, and the second multiplexer 108 determines whether the second device is another host or another slave device.

Step 606: The first device optionally communicates with the second device through the first multiplexer 104, the host-to-host bridge 106, and the second multiplexer 108, or through the first multiplexer 104 and the second multiplexer 108 according to determination results of the first multiplexer 104 and the second multiplexer 108.

Step 608: End.

In Step 602, as shown in FIG. 1, because the first type C connector 102 is coupled to the first multiplexer 104, and the second type C connector 112 is coupled to the second multiplexer 108, the first device can be coupled to the first multiplexer 104 through the first type C connector 102 and the second device can be coupled to the second multiplexer 108 through the second type C connector 112. In Step 604, taking FIG. 2 as an example, the first multiplexer 104 can utilize the first pull-down resistor 1042 to determine whether the first device 202 is the first host or the first slave device, and the second multiplexer 108 can utilize the second pull-down resistor 1082 to determine whether the second device 204 is the second host or the second slave device.

In Step 606, taking FIG. 3 as an example, after the first multiplexer 104 determines that the first device 202 is the first host, the first master/slave coupling relationship between the first device 202 and the first multiplexer 104 can be established. After the second multiplexer 108 determines that the second device 204 is the second slave device, the second master/slave coupling relationship between the second device 204 and the second multiplexer 108 can be established. As shown in FIG. 3, after the first master/slave coupling relationship and the second master/slave coupling relationship are established, the first multiplexer 104 is switched to directly communicate with the second multiplexer 108. That is, after the first master/slave coupling relationship and the second master/slave coupling relationship are established, the first device 202 bypasses the host-to-host bridge 106 to communicate with the second device 204 directly through the first multiplexer 104 and the second multiplexer 108. In addition, as shown in FIG. 3, because the first device 202 is the first host and the second device 204 is the second slave device, the host-to-host bridge 106 turns on the switch 110. Thus, first device 202 the first device 202 can supply power to the second device 204 through the signal line VBUS and the switch 110.

In addition, in Step 604, taking FIG. 4 as an example, the first multiplexer 104 can utilize the first pull-down resistor 1042 to determine whether the first device 402 is the third host or the third slave device, and the second multiplexer 108 can utilize the second pull-down resistor 1082 to determine whether the second device 404 is the fourth host or the fourth slave device.

In Step 606, taking FIG. 5 as an example, after the first multiplexer 104 determines that the first device 402 is the third host, the third master/slave coupling relationship between the first device 402 and the first multiplexer 104 can be established. After the second multiplexer 108 determines that the second device 404 is the fourth host, the fourth master/slave coupling relationship between the second device 404 and the second multiplexer 108 can be established. As shown in FIG. 5, after the third master/slave coupling relationship and the fourth master/slave coupling relationship are established, the first multiplexer 104 is switched to communicate with the second multiplexer 108 through the host-to-host bridge 106. That is, after the third master/slave coupling relationship and the fourth master/slave coupling relationship are established, the first device 402 communicates with the second device 404 through the first multiplexer 104, the host-to-host bridge 106, and the second multiplexer 108. In addition, as shown in FIG. 5, because the first device 402 is the third host and the second device 404 is the fourth host, the host-to-host bridge 106 turns off the switch 110.

To sum up, the USB type C transmission line and the USB type C transmission device utilize the first multiplexer and the second multiplexer to determine master/slave roles of a device and another device respectively when the first multiplexer and the second multiplexer are coupled to the device and the another device, respectively. Then, the USB type C transmission line and the USB type C transmission device make the device optionally communicate with the another device through the host-to-host bridge, the first multiplexer, and the second multiplexer, or through the first multiplexer and the second multiplexer according to the determination results of the first multiplexer and the second multiplexer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A universal serial bus (USB) type C transmission line, comprising:
   a switch;
   a host-to-host bridge;
   a first multiplexer; and
   a second multiplexer, wherein when the first multiplexer and the second multiplexer are coupled to a first device and a second device respectively, the first multiplexer determines whether the first device is a host or a slave device and the second multiplexer determines whether the second device is another host or another slave device, and the first device optionally communicates with the second device through the host-to-host bridge, the first multiplexer, and the second multiplexer, or through the first multiplexer and the second multiplexer according to determination results of the first multiplexer and the second multiplexer;
   wherein the first device optionally supplies power to the second device when the switch is turned on, or does not supply power to the second device when the switch is turned off.

2. The USB type C transmission line of claim 1, wherein when the first multiplexer is coupled to the first device, the first multiplexer utilizes a first pull-down resistor to determine whether the first device is the host or the slave device, and when the second multiplexer is coupled to the second device, the second multiplexer utilizes a second pull-down resistor to determine whether the second device is the another host or the another slave device.

3. The USB type C transmission line of claim 2, wherein when the first multiplexer determines that the first device is the host and the second multiplexer determines that the second device is the another host, the first device communicates with the second device through the host-to-host bridge, the first multiplexer, and the second multiplexer.

4. The USB type C transmission line of claim 2, wherein when the first multiplexer determines that the first device is the host and the second multiplexer determines that the second device is the another slave device, the first device communicates with the second device through the first multiplexer and the second multiplexer.

5. The USB type C transmission line of claim 1, wherein the first multiplexer, the host-to-host bridge, and the second multiplexer are coupled to a first USB super speed signal line group of two USB super speed signal line groups and a USB 2.0 signal line group.

6. The USB type C transmission line of claim 1, wherein when the first device communicates with the second device through the first multiplexer and the second multiplexer, the first device bypasses the host-to-host bridge to communicate with the second device through the first multiplexer and the second multiplexer.

7. The USB type C transmission line of claim 1, wherein when the first device communicates with the second device through the first multiplexer and the second multiplexer, the host-to-host bridge turns on the switch and the first device supplies the power to the second device through the switch, and when the first device communicates with the second device through the host-to-host bridge, the first multiplexer, and the second multiplexer, the host-to-host bridge turns off the switch.

8. A USB type C transmission line, comprising:
   a switch;
   a host-to-host bridge;
   a first multiplexer; and
   a second multiplexer, wherein a first device coupled to the first multiplexer optionally communicates with a second device coupled to the second multiplexer through the host-to-host bridge, the first multiplexer, and the second multiplexer, or through the first multiplexer and the second multiplexer;
   wherein the first device optionally supplies power to the second device when the switch is turned on, or does not supply power to the second device when the switch is turned off.

9. The USB type C transmission line of claim 8, wherein when the first device and the second device are hosts, the first device communicates with the second device through the host-to-host bridge, the first multiplexer, and the second multiplexer; and when the first device and the second device are a host and a slave device respectively, the first device bypasses the host-to-host bridge to communicate with the second device only through the first multiplexer and the second multiplexer.

10. A USB type C transmission device, comprising:
    a host-to-host bridge; and
    a switch;
    wherein a first device coupled to the USB type C transmission device communicates with a second device coupled to the USB type C transmission device optionally through the host-to-host bridge;
    wherein the first device optionally supplies power to the second device when the switch is turned on, or does not supply power to the second device when the switch is turned off.

11. The USB type C transmission device of claim 10, wherein when the first device communicates with a second device not through the host-to-host bridge, the first device bypasses the host-to-host bridge to communicate with the second device.

12. The USB type C transmission device of claim 10, wherein the switch is turns on or off according to whether the first device bypasses the host-to-host bridge to communicate with the second device.

13. The USB type C transmission device of claim 12, wherein the switch is a power transistor.

* * * * *